US005201969A

United States Patent [19]
Nishi et al.

[11] Patent Number: 5,201,969
[45] Date of Patent: Apr. 13, 1993

[54] RADIAL TIRE FOR HEAVY DUTY VEHICLE INCLUDING A FOLDED BELT LAYER

[75] Inventors: Minoru Nishi, Kobe; Yoshiyuki Takada; Naoki Asakawa, both of Shirakawa, all of Japan

[73] Assignee: Sumitomo Rubber Industries, Ltd., Hyogo, Japan

[21] Appl. No.: 555,625

[22] Filed: Jul. 23, 1990

[30] Foreign Application Priority Data

Jul. 24, 1989 [JP] Japan ................... 1192084

[51] Int. Cl.$^5$ .......................... B60C 9/26; B60C 9/20; B60C 9/18
[52] U.S. Cl. .................... 152/527; 152/529; 152/534; 152/537; 152/538
[58] Field of Search ............... 152/526–529, 152/531–533, 535–538

[56] References Cited

U.S. PATENT DOCUMENTS 3,851,692 12/1974 Takemura et al.
4,273,177 6/1981 Nybakken.
4,446,905 5/1984 Tamura et al.
4,762,158 8/1988 Furuya et al.

FOREIGN PATENT DOCUMENTS 2302873 10/1976 France.
53-18105 2/1978 Japan.
57-4406 1/1982 Japan ................... 152/528
59-67108 4/1984 Japan.

*Primary Examiner*—Michael W. Ball
*Assistant Examiner*—Adrienne C. Johnstone
*Attorney, Agent, or Firm*—Birch, Stewart, Kolasch & Birch

[57] ABSTRACT

A radial tire for heavy duty vehicles having a steel belt layer with triangular structure which is composed of at least three belt plies of steel belt disposed on a carcass, and a middle layer which contains cords of aromatic polyamide fibers which is laid between first belt ply and second belt ply viewed from tread surface side among the belt plies.

The middle layer has skirts which are folded over from a main portion of the middle layer and laid between the first and second belt plies so as to wrap around each axial outer end of the first belt ply.

The cords of the first belt play and the cords of the second belt ply cross each other at an angle of from 10 to 30 deg. against the tire equator, and the cords of the middle layer slant in the same direction as that of first belt ply at an angle of 3 deg. or less against that of first belt ply.

5 Claims, 8 Drawing Sheets

RADIAL TIRE FOR HEAVY DUTY VEHICLE INCLUDING A FOLDED BELT LAYER

BACKGROUND OF THE INVENTION

The present invention relates to a radial tire for heavy duty vehicles which can restrain belt edge separation so as to improve high speed durability.

Heretofore, in a radial tire for such a heavy duty vehicle as a truck, bus and the like, a belt layer (b) composed of at least three belt piles (b1, b2, bn) of steel cords having the same modulus of elasticity to each other is arranged on a carcass (a), as shown in FIG. 5.

Further, in the belt layer (b), as shown in FIGS. 6 and 7, each cord of two belt piles (b1 and b2) laid radially outwardly is arranged in such a way that each cord angle against the equator is smaller than that of the innermost belt ply (bn) adjacent to the carcass (a), and the cords of belt piles (b1 and b2), in the case of n=3, cross with each other, and in the case of n=4, are arranged at the same direction. Thus the triangular structure is constituted as a whole so as to reinforce the tread part evenly with high rigidity.

However, it is well known that such a is subjected to the so-called ply separation in which the radially outermost belt ply (b1) separates from it's edges during high speed running so as to reduce high speed durability. This is caused because such a is often used under high load conditions so that tread the internal temperature becomes higher than a conventional tire. In addition, a belt layer (b1) is formed by cut end plies so that a restriction force on a tire case around the ply edge area becomes lower, as the result, due to an increase of the ground contact pressure accompanied with a growth in the outer diameter around the tread shoulder, whereby the tread internal temperature in such region further increases. In addition, because the outermost belt ply (b1), which directly receives the stress change from ground contact area is subjected to the most severe shearing strain, separation between belt plies b1 and b2 is accelerated.

Further, when the number of belt plies are three, each cord of the belt plies b1 and b2 are crossed with each other so that when a deforms, each cord extends to a different direction with respect to each other, and accordingly, a shearing stress acts between belt plies b1 and b2, whereby ply edge separation of belt ply (b1) is produced in cooperation with said increase of temperature at the shoulder region.

In order to prevent such ply separation, there are proposals that a rubber compound having low heat generation with a small loss fact is utilized as a tread rubber, or the tread rubber thickness gauge, in particular, the shoulder rubber gauge is reduced. However, such means cannot achieve an advantage effect but rather induces many problems on tire performance. For example, to adopt a rubber having low heat generation is to reduce road gripping performance, and to reduce tread rubber gauge which causes a deterioration in wear life and even wear.

Further, as the means to prevent such belt ply separation there is disclosed in Japanese patent application laid open No.59-67108 that, as shown in FIGS. 8 and 9, in the belt layer (b) composed of four steel belt plies b1, b2, b3 and b4, in order to prevent occurrence of shearing strain caused by difference of belt cord angle between second and third belt plies b2 and b3 counted from the tread side, the steel belt b3 is replaced by a belt ply composed of organic fiber cords to reduce ply separation between belt ply b2 and b3. In addition, both edges of the belt ply b2 are covered by organic fiber cords of the belt ply b3, thereby reducing the shearing strain at the edge of the belt ply b2 so as to prevent ply separation.

However, as regards an all steel tire comprising a carcass and a belt layer each composed of steel cords actually used for truck and bus tires, ply separation of the belt layer b is liable to occur between belt plies b1 and b2, because the belt ply b1 most adjacent to the ground contacting tread surface is most severely subjected to deformation from the ground. Accordingly, the prior art according to the patent publication can not prevent such ply separation.

On the other hand, Japanese patent application laid open No. 53-18105 teaches that ply edges of the outermost belt ply are covered by folding the edge parts of a belt ply laid adjacent and under the outermost belt ply. However, this publication is directed to a tire for a large vehicle used for off road operation. In addition, such a belt construction which is easy to deform in going with a rough road is adopted.

Accordingly, the prior art does not prevent ply separation of an outermost steel belt layer and does not improve high speed durability while maintaining tire performance of steel radial tires for truck and bus use.

SUMMARY OF THE INVENTION

It is hence a primary object of the invention to provide a tire for heavy duty vehicles which can restrain ply separation and can improve high speed durability without deterioration in tire performance.

According to one aspect of the present invention, a radial tire for heavy duty vehicles comprises a carcass with a radial structure extending from the tread through the side walls and wrapped around a bead core in each of two beads, a steel belt layer with a triangular structure composed of at least three belt plies each containing steel belt cords and laid radially outside said carcass, and a middle layer containing cords consisting of aromatic polyamide fibers, wherein:

the first belt ply which is positioned most outside in the radial direction among said belt plies has belt cords inclined at an angle from 10 degrees to 30 degrees to the tire equator;

the second belt ply is positioned radially inside said first belt ply having belt cords inclined in the opposite direction to the belt cords of said first belt play at an angle from 10 degrees to 30 degrees to the tire equator;

the middle layer has a main portion provided between said first and second belt ply and skirts folded over onto said first belt ply from both axial outer ends of said main portion so as to wrap around each axial outer end of said first belt ply; and said cords of said middle layer at the main portion slant in the same direction as the belt cords of said first belt ply and are arranged at an inclined angle of 3 degrees or less to the belt cords of said first belt ply.

In this tire, the middle layer laid between the first and the second belt plies is composed of aromatic polyamide fiber cords having relatively higher elongation than that of the steel belt cords, whereby the shearing force acting between the first and the second belt plies during tire deformation is mitigated. Further, by covering the lateral cut edges of the first belt ply with skirts to increase the adhesion to rubber, in addition, due to the high hoop effect produced by the skirts at the lateral outer edges to restrain the growth of the outer diameter during high speed running, the high speed durability of the tire is improved.

BRIEF DESCRIPTION OF THE DRAWINGS

An embodiment of the present invention will now be described by way of example, referring to the attached drawings, in which.

DETAILED DESCRIPTION OF THE INVENTION

Figure 1:
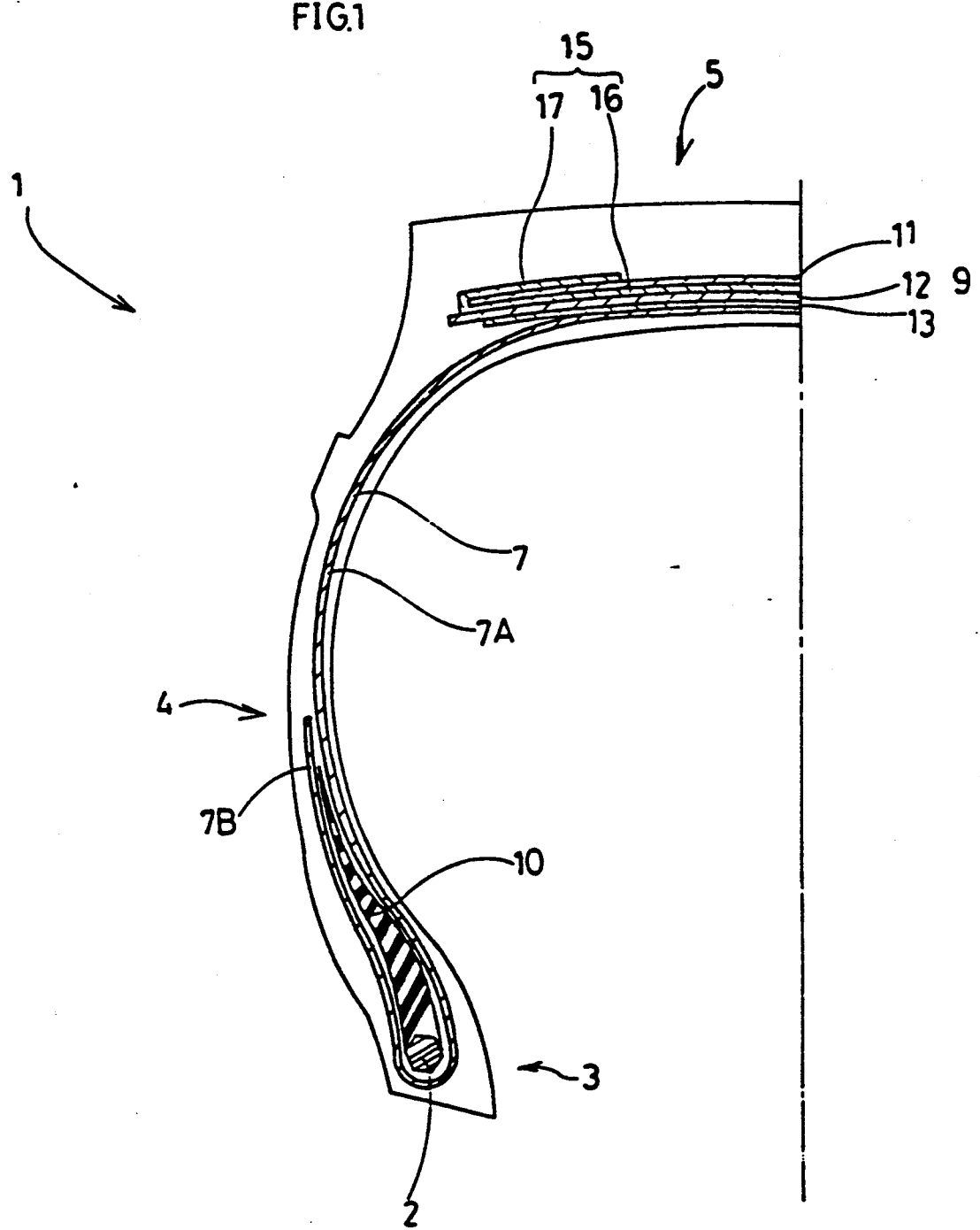
FIG. 1 is a sectional view showing one embodiment of the present invention.
Figure 2:
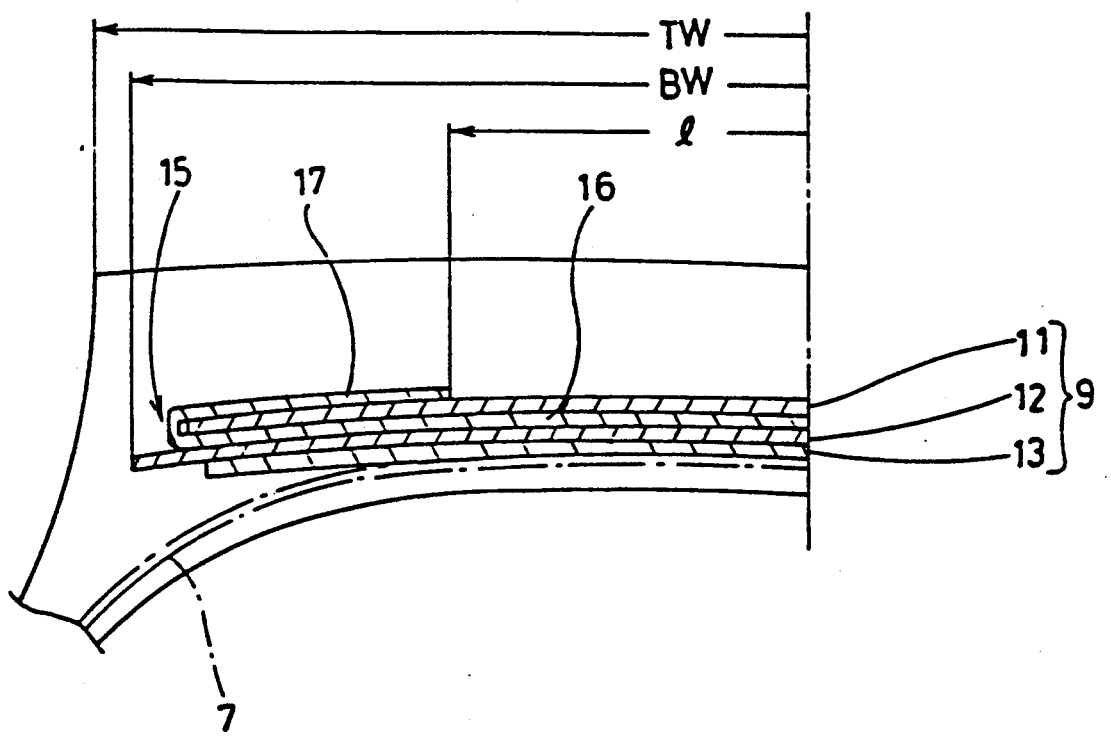
FIG. 2 is an enlarged sectional view showing said belt layer.
Figure 3:
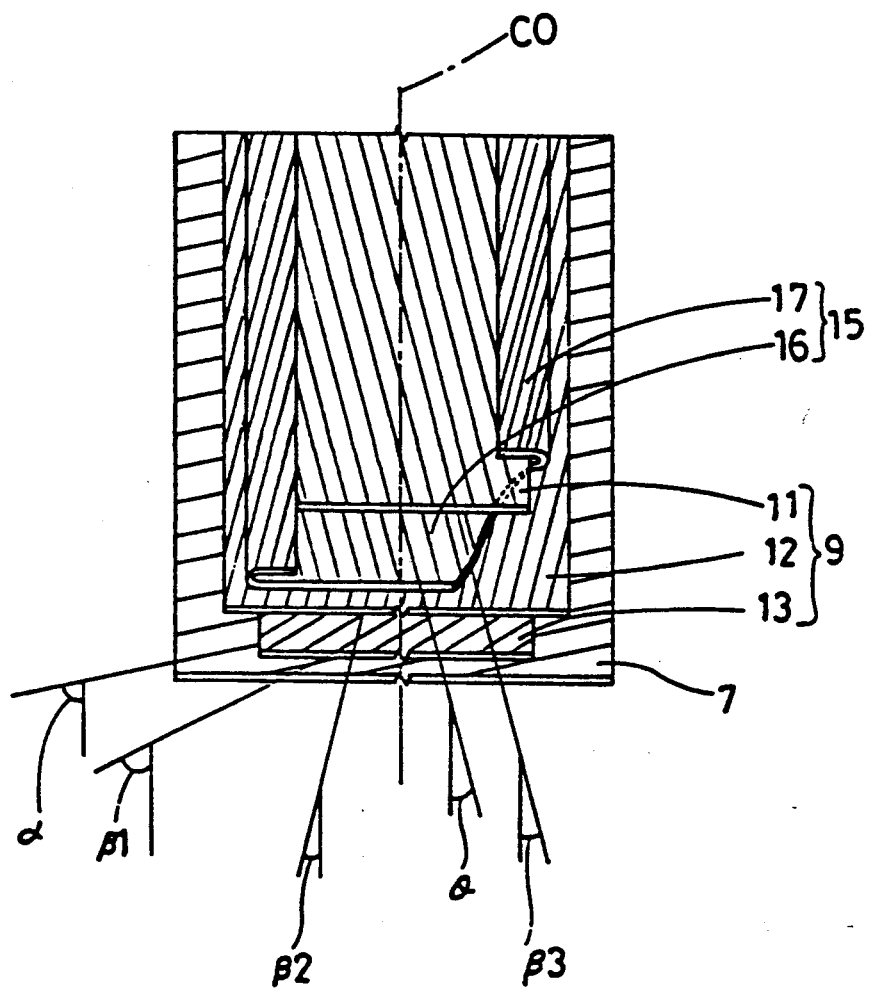
FIG. 3 is a plan view showing the belt layer only.

In FIG. 1 to 3, the tire 1 for heavy duty vehicles comprises bead regions 3 each reinforced by an annular bead core 2, sidewalls 4 extending from said bead regions 3, radially outward of the tire, and a tread 5 disposed between and connecting with each outer edge of said sidewalls 4. Between bead regions 3 and 3, there is provided a carcass 7 of which the main portion 7A extends from the tread 5 through sidewalls 4 to the bead region 3 and 3 and the turned up portions 7B are wrapped around bead core 2 from the inside to the outside thereof. A steel belt layer 9 is arranged radially outwardly of said carcass 7 and inwardly of the tread 5.

Said carcass 7 has a semi-radial or radial structure composed of at least one carcass ply of carcass cords laid at an angle ranging from 75 degrees to 90 degrees with respect to the equator of the tire. Organic or inorganic fiber cord may be employed as a carcass cords, although in this embodiment, steel cord is adopted.

A tapered triangular bead apex 10 made of hard rubber extending outwardly in the radial direction from bead core 2 is provided between the carcass main portion 7A and it's turned up portion 7B to reinforce said sidewall 5, whereby the lateral rigidity of the tire is increased.

Said steel belt layer 9, in this embodiment, is composed of three layers, a first belt ply 11, a second belt ply 12 and a third belt ply 13 are respectively laid from tread surface side toward carcass side in order. The second belt ply 12 is made wider than the first belt ply 11 and the third belt play 13 is made narrower than the first belt ply 11. Furthermore the maximum width BW of said steel belt layer 9, that is, in this embodiment, the width of the second belt ply 12 is made to be more than 0.83 and less than 0.99 times the tread width TW, whereby the steel belt layer 9 can cover substantially the full width of the tread to increase the hoop effect.

The first, second and third belt plies 11, 12 and 13 are respectively made of steel cords of which initial modulus of elasticity is at least $15 \times 10^5$ kg/cm². The third belt ply 13 contains belt cords laid at an angle $\beta 1$ ranging from 50 degrees to 70 degrees with respect to the equator CO of the tire, for example, inclining in the right upward direction as said carcass cord. The second belt ply 12 contains belt cords laid at an angle $\beta 2$ ranging from 10 degrees to 30 degrees with respect to the equator CO of the tire in the right upward direction, and the first belt ply contains belt cords laid at an angle $\beta 3$ ranging from 10 degrees to 30 degrees with respect to the equator of the tire in the left upward direction.

Accordingly, the belt layer 9 can form the triangular structure having the high hoop effect substantially all over the whole width of the tread 5 by crossing each belt cord of each belt plies 11, 12 and 13. On the other hand, belt cords of the second and third belt plies 12 and 13 are laid at the same direction so that the shearing strain between the second and third belt ply 12 and 13, which generates by deformation of the tire during running, is mitigated. In addition, the cord angle $\beta 3$ of the third belt ply 13 is arranged at the middle between the cord angle $\alpha$ of the carcass 7 and the cord angle $\beta 2$ of the second belt ply 12, whereby separation between said carcass 7 and belt layer 9 is reduced.

According to the present invention, the middle layer 15 is provided between the first and the second belt plies 11 and 12 to prevent separation of the first belt ply 11, which is the radially outermost belt ply. The middle layer 15 is the fold end ply formed in such a way that the main portion 16 of the middle layer 15 is laid between the first and the second belt ply 11 and 12 and of which both lateral ends are folded up onto said first belt ply 11 toward the equator CO to from two skirts 17 wrapping the around lateral outer end of said first belt ply 11 between the main portion and lateral skirts 17 thereof.

The middle layer 15 is composed of organic fiber cord having lower elasticity than steel cord and relatively high extensibility and high heat resistance, that is, aromatic polyamide fiber cords whose initial modulus of elasticity is $13 \times 10^5$ kgf/cm² or less. The cords of the middle layer 15 are embedded in a coating rubber at a slant angle $\theta$ of 3 degrees or less with respect to the belt cord contained in the first belt ply 11.

Accordingly, the middle layer 15 can mitigate the shearing strain acting between the first and the second belt plies 11 and 12 due to its relatively high extensibility. On the other hand the cord of said middle layer 15 at the main portion 16 and that of the first belt ply 11 are laid at about the same direction so as increase adhesion between the middle layer 15 and the first belt ply 11.

Furthermore, the middle layer 15 covers the lateral outer cut ends of the first belt ply 11 by its skirts 17 to extert a restriction force on the carcass 7 at said outer ends and to restrain the heat build up caused by the growth of the outer diameter at tread shoulder region and uneven wear.

If such organic fiber cords as nylon, rayon, polyester and the like are used as cords for the middle layer 15, the restriction force on the carcass becomes insufficient so that growth of outer diameter is not restrained and resistance to heat becomes poor.

As the cords for the middle layer 15, 1500d/2 with twist number of $35 \times 35/10$ cm of aromatic polyamide fiber cord are preferably employed.

Further, as said coating rubber, a rubber compound having the 100% modulus (100M) in the range of 25 to 50 kg/cm², a 300% modulus (300M) in the range of 100 to 200 kg/cm², a JISA hardness (HA) in the range of 75 to 80 deg., a complex modulus (E*) of elasticity in the range of 50 to 200 kg/cm² and a loss factor (tan $\delta$) in the range of 0.1 to 0.2 is preferably employed. Such a rubber compound is soft with low heat generation and small energy loss, whereby said shearing strain is much more reduced so as to prevent separation between the middle layer 15 and the second belt ply 12.

The value of the complex modulus (E*) of elasticity and the loss factor (tan δ) are value measured by using a visco elastic spectrometer made by Iwamoto seisakusho at a frequency of 20 HZ and a dynamic strain of 2% under a static elongation strain of 10% at 70 degrees. A sample is shaped in the form of a strip having a length of 30 mm, a width of 4 mm and a thickness of 1.5 mm.

The axial distance 1 between the innermost free edges of the skirt 17 of the middle layer 15 is set to be 0.8 times the tread width TW or less, preferably 0.4 times or less.

Thus, the innermost free edges of the skirt 17 are terminated at the tread central part in which the deformation of a tire is relatively small, so that the stress concentration on said free edges is mitigated. By this reason, the distance may set to be O, that is, both free edges may be jointed face to face with each other (butted joint). However, an overlapped joint is not preferable because of the thickness variation. Excepting said butted joint, the distance 1 is set to be more than 0.2 times the tread width TW, whereby the cost and the weight may be reduced while maintaining the aforesaid effect.

Figure 4:
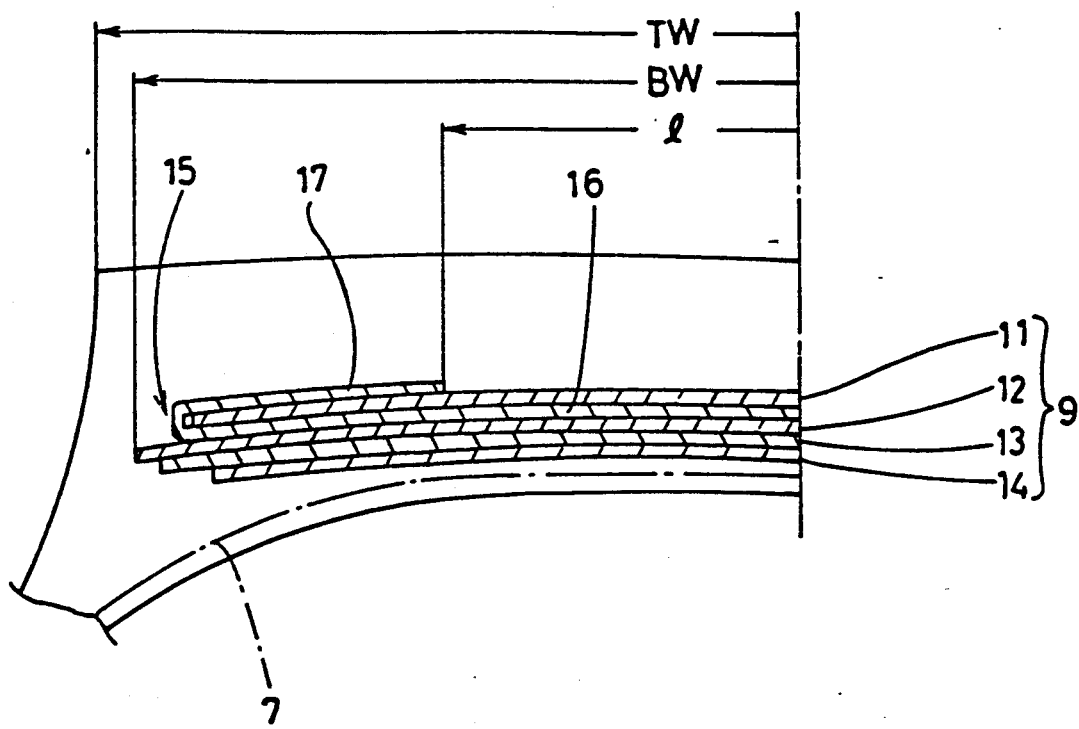
FIG. 4 is a sectional view showing another embodiment.

FIG. 4 shows another embodiment of the present invention in which the belt layer 9 is composed of four steel belt plies 11, 12, 13, 14. In this embodiment, the cords of the first and the second belt plies 11 and 12 are laid at an angle ranging from 10 degrees to 30 degrees with a left upwards inclination. The cords of the third belt play 13 are laid at an angle ranging from 10 degrees to 30 degrees with a right upward inclination. The cords of the fourth belt ply 14 are laid at an angle ranging from 60 degrees to 70 degrees with a right upwards inclination.

Embodiment

Various test tires in size 11R22.5 14PR,HW-J were made by the specification shown in Table 1(A) and 1(B), and high speed durability was evaluated by a drum tester under a load of 1.4 times the normal specific load, starting from speed 100 km/H, after 2 hours running, 10 km/H speed is stepped up by two hours running.

The speed when the tire was destroyed was measured as a durability index.

The test results are summarized in Table 1(A) and 1(B), with the results being expressed as indexes by using 100 as the measured value for the comparative example 1, in which the higher index is better.

Wear resistance actual vehicle tests were carried out under the following conditions:
Load per tire: about 2700 kg
Internal pressure: 7.15 kg/cm$^2$
Average speed: about 60 km/H
Generally good roads The degree of wear at the tread part after running for 80,000 km was measured.

As shown in Table 1(A) and 1(B), the tire for heavy duty vehicles according to the present invention shows improved high speed durability having about 5 to 15% of a higher value than the conventional tire having the same wear resistance.

As previously described, the tire according to the present invention improves high speed durability without deteriorating the tire performances, because the middle layer of the fold end ply composed of aromatic polyamide fiber cords is inserted between the first and the second belt plies to mitigate the shearing strain acting between them. On the other hand, since the growth of the outer diameter at the tread shoulder part is restrained, in addition, by increasing adhesion of ends of the first belt ply to rubber, belt separation is prevented.

TABLE 1(A)

| | | | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|---|
| Tyre structure | | | FIG. 2 | FIG. 2 | FIG. 2 | FIG. 2 | FIG. 2 | FIG. 2 | FIG. 2 | FIG. 2 |
| cord angle of blet ply (deg.) *1 | first | (11)(b1) | 16 | 16 | 16 | 16 | 16 | 16 | 16 | 16 |
| | second | (12)(b2) | 16 | 16 | 16 | 16 | 16 | 16 | 16 | 16 |
| | third | (13)(b3) | 67 | 67 | 67 | 67 | 67 | 67 | 67 | 67 |
| | fourth | (14)(b4) | — | — | — | — | — | — | — | — |
| middle layer | cord | material | | | | aromatic polyamide | | | | |
| | | diameter | | | | 1500 d/2 | | | | |
| | | twist number | | | | 35 × 35/10 cm | | | | |
| | | embedded cord number/5 cm | | | | 32 | | | | |
| | | cord angle (θ) | 19 | 13 | 16 | 19 | 19 | 19 | 19 | 19 |
| | coating rubber | M100 (kg/cm$^2$) | 20 | 20 | 20 | 55 | 55 | 20 | 20 | 25 |
| | | M300 (kg/cm$^2$) | 80 | 80 | 80 | 220 | 220 | 80 | 80 | 100 |
| | | JISA hardness (deg.) | 74 | 74 | 74 | 81 | 81 | 74 | 74 | 75 |
| | | E* (kg/cm$^2$) | 45 | 45 | 45 | 220 | 220 | 45 | 45 | 50 |
| | | tanδ | 0.10 | 0.10 | 0.10 | 0.20 | 0.20 | 0.10 | 0.10 | 0.10 |
| 1 | | | 0.8 TW | 0.7 TW | 0.8 TW | 0.8 TW | 0.4 TW | 0.4 TW | 0.2 TW | 0.4 TW |
| high speed durability | | | 104 | 104 | 108 | 104 | 107 | 107 | 109 | 109 |
| wear resistance | | | 100 | — | 100 | — | 100 | 100 | 100 | — |

| | | | | Embodiment 9 | Embodiment 10 | Embodiment 11 |
|---|---|---|---|---|---|---|
| | Tyre structure | | | FIG. 2 | FIG. 2 | FIG. 4 |
| | cord angle of blet ply (deg.) *1 | first | (11)(b1) | 16 | 16 | 16 |
| | | second | (12)(b2) | 16 | 16 | 16 |
| | | third | (13)(b3) | 67 | 67 | 16 |
| | | fourth | (14)(b4) | — | — | 67 |
| | middle layer | cord | material | | aromatic polyamide | |
| | | | diameter | | 1500 d/2 | |
| | | | twist number | | 35 × 35/10 cm | |
| | | | embedded cord number/5 cm | | 32 | |
| | | | cord angle (θ) | 19 | 19 | 16 |
| | | coating | M100 (kg/cm$^2$) | 35 | 50 | 35 |

TABLE 1(A)-continued

|  |  |  |  |  |  |
|---|---|---|---|---|---|
| | rubber | M300 (kg/cm$^2$) | 150 | 200 | 150 |
| | | JISA hardness (deg.) | 77 | 80 | 77 |
| | | E* (kg/cm$^2$) | 120 | 700 | 120 |
| | | tanδ | 0.15 | 0.20 | 0.15 |
| l | | | 0.4 | 0.4 | 0.4 |
| | | | TW | TW | TW |
| high speed durability | | | 115 | 109 | 115 |
| wear resistance | | | 100 | — | 100 |

*1 A material of the belt cord — steel (Except *2 of comparison 4)
structure of the belt cord — 3 × 0.20 + 6 × 0.38/1.19
twisting pitch of the belt cord — 9.5 × 17.5 mm
*2 belt cord of the belt ply (b3) in comparison 4 — material: aromatic polyamide
diameter: 1500 d/2
twist number: 35 × 35/10 cm
embedded cord number/5 cm: 32 coating rubber of comparison 4 shows coating rubber belt ply (b3)

TABLE 1(B)

Figure 5:
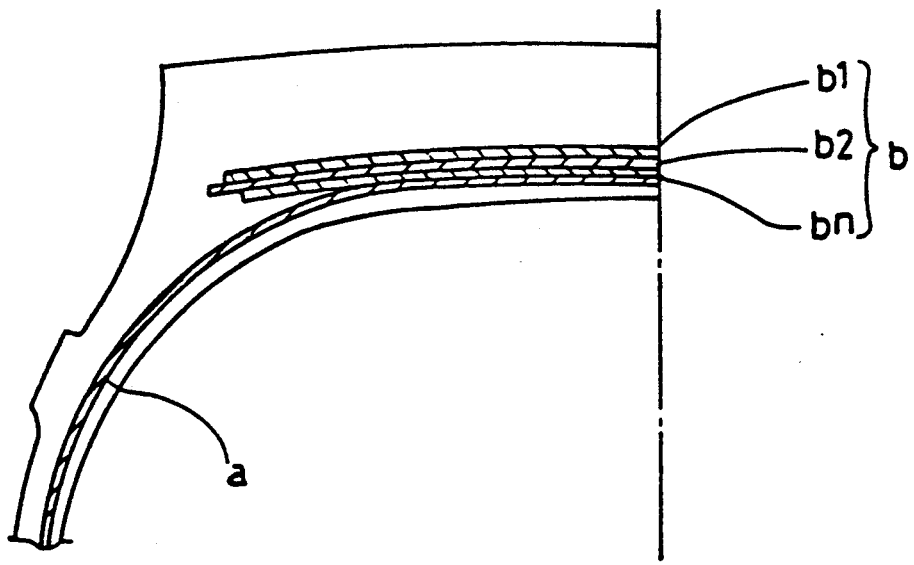
FIG. 5 is a sectional view showing a conventional tire.
Figure 6:
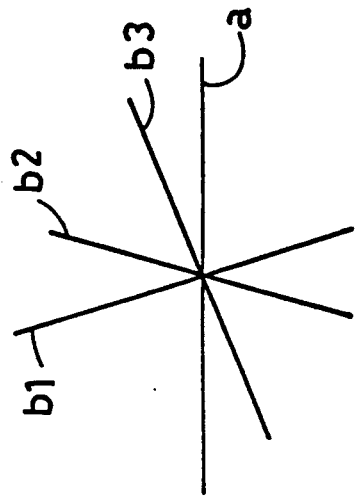
FIGS. 6 and 7 are views showing the cord angles.
Figure 7:
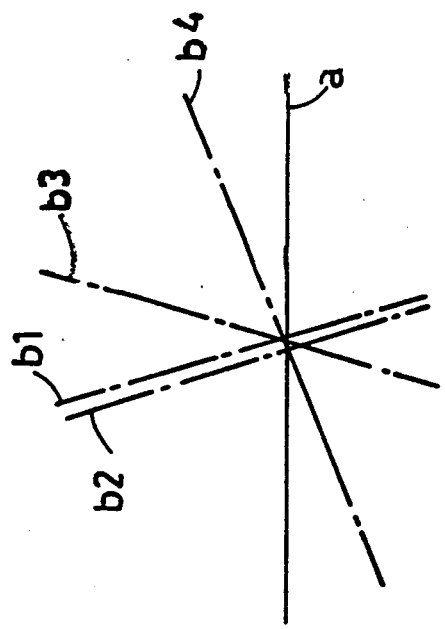
Figure 8:
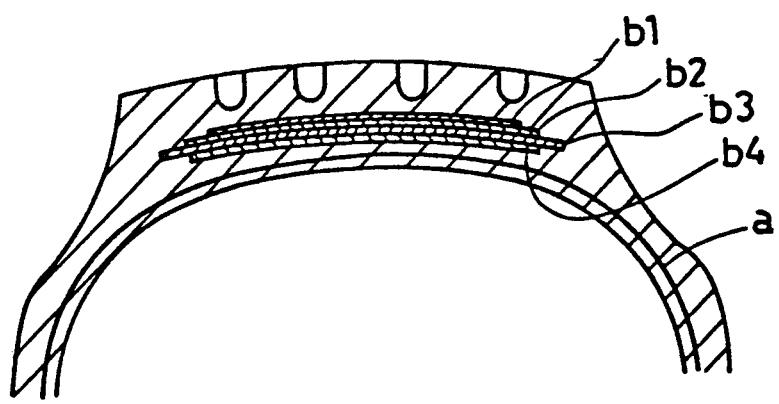
FIG. 8 is a sectional view showing other conventional tire.
Figure 9:
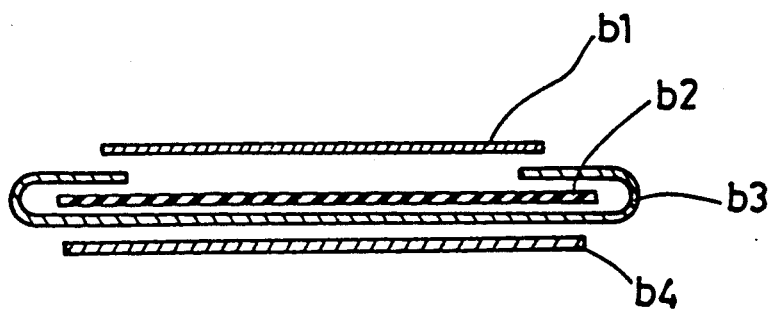
FIG. 9 is a sectional view showing a belt structure according to the prior art.

| | | | comparison example 1 | comparison example 2 | comparison example 3 | comparison example 4 |
|---|---|---|---|---|---|---|
| Tyre structure | | | FIG. 5 | FIG. 8 | FIG. 2 | FIG. 9 |
| cord angle of blet ply (deg.) *1 | first | (11)(b1) | 16 | 16 | 16 | 16 |
| | second | (12)(b2) | 16 | 16 | 16 | 16 |
| | third | (13)(b3) | 67 | 16 | 67 | 16*2 |
| | fourth | (14)(b4) | — | 67 | — | 67 |
| middle cord layer | material | | — | — | nylon | — |
| | diameter | | — | — | 840 d/2 | — |
| | twist number | | — | — | 47.2 × 47.2/10 cm | — |
| | embedded cord number/5 cm | | — | — | 33 | — |
| | cord angle (θ) | | — | — | 16 | 16 |
| | base rubber | M100 (kg/cm$^2$) | — | — | 35 | 35 |
| | | M300 (kg/cm$^2$) | — | — | 150 | 150 |
| | | JISA hardness (deg.) | — | — | 77 | 77 |
| | | E* (kg/cm$^2$) | — | — | 120 | 120 |
| | | tanδ | — | — | 0.15 | 0.15 |
| l | | | — | — | 0.4 | 0.4 |
| | | | | | TW | TW |
| high speed durability | | | 100 | 100 | 102 | 100 |
| wear resistance | | | 100 | 100 | 100 | 90 |

We claim:

1. A radial tire for heavy duty vehicles comprising a carcass with a radial structure extending from a tread through side walls and wrapped around a bead core in each of two beads, a steel belt layer with triangular structure composed of at least three belt plies each containing steel belt cords and laid radially outside said carcass, and a middle layer containing cords consisting of aromatic polyamide fibers, wherein:
   the first belt ply positioned outermost in the radial direction, among said belt plies has belt cords inclined at an angle of from 10 to 30 degrees to the tire equator;
   the second belt ply positioned radially inside first belt ply has belt cords inclined in the opposite direction to the belt cords of said first belt ply at an angle of from 10 to 30 degrees to the tire equator;
   said middle layer has a main portion provided between said first and second belt plies and includes skirts folded over onto said first belt ply from both axial outer ends of said main portion so as to wrap around each axial outer end of said first belt ply; and
   said cords of said middle layer at the main portion slant in the same direction as the belt cords of said first belt ply and are arranged at an inclined angle of 3 degrees or less to the belt cords of said first belt ply, wherein said cords of middle layer are embedded in a rubber compound of which the 100% modulus is 25–50 kg/cm$^2$, the 300% modulus is 100–200 kg/cm$^2$, the JISA hardness is 75–80 deg., the complex modulus of elasticity is 50–200 kg/cm$^2$, and the loss factor is 0.1–0.2.

2. The radial tire for heavy duty vehicles according to claim 1, wherein said middle layer is composed of aromatic polyamide fiber cords with a size of 1500d/2 and a twist number of 35×35 T/10 cm.

3. The radial tire for heavy duty vehicles according to claim 1 or 2, wherein said middle layer is formed so that the distance (l) in the axial direction between each innermost end of said skirts is 0.4 times the tread width (TW) or less.

4. The radial tire for heavy duty vehicles according to claim 1, wherein said belt cords of the first, second and third belt plies have initial modulus of elasticity of more than 15×10$^5$ kg/cm$^2$, and said cords of the middle layer have an initial modulus of elasticity of less than 13×10$^5$ kg/cm$^2$.

5. The radial tire for heavy duty vehicles according to claim 1, wherein the third belt ply is positioned radially inside the second belt ply and contains belt cords laid at an angle of from 50 to 70 degrees with respect to the equator of the tire.

* * * * *